United States Patent
Pruitt et al.

[19]

[11] Patent Number: 6,080,045
[45] Date of Patent: Jun. 27, 2000

[54] MACHINING METHODS AND APPARATUS

[76] Inventors: James E. Pruitt; Jeffery Scott Pruitt, both of 1402 Rural St., Rockford, Ill. 61107

[21] Appl. No.: 09/078,855

[22] Filed: May 14, 1998

[51] Int. Cl.[7] ................................................ B24B 9/04
[52] U.S. Cl. .......................... 451/49; 451/332; 451/339; 451/182
[58] Field of Search .................................. 451/178, 182, 451/244, 245, 246, 332, 339, 48, 49

[56] References Cited

U.S. PATENT DOCUMENTS

| | | | |
|---|---|---|---|
| 3,552,069 | 1/1971 | Butler | 51/165 |
| 4,546,573 | 10/1985 | Shiba et al. | 51/165.72 |

OTHER PUBLICATIONS

Photocopies of four photographs of a model RG–100 machine manufactured and sold by Hertlein Special Tool Co., Inc., 545 Franklin Avenue, Mount Vernon, New York 10550, Telephone No. 914–668–5552.

*Primary Examiner*—David A. Scherbel
*Assistant Examiner*—Dermott J. Cooke
*Attorney, Agent, or Firm*—Keith Frantz

[57] ABSTRACT

A rotating fixture releasably carries work pieces in a circular path for parading the work pieces, one-by-one, through machining engagement with a grinding wheel for grinding a desired feature or surface onto each work piece. The fixture is adapted such that the work pieces can be quickly snapped into position, and provision is made for automatically ejecting the finished parts from the fixture. A clamping apparatus clamps the work pieces in place in the fixture, one-by-one, just prior each piece reaching the tool, and then releases the work piece after the machining on each part is finished.

17 Claims, 10 Drawing Sheets

MACHINING METHODS AND APPARATUS

BACKGROUND OF THE INVENTION

The present invention relates to methods and apparatus for machining features such as flat surfaces onto work pieces, and more particularly, to methods and apparatus particularly useful in connection with machining such surfaces onto large quantities of relatively small, identical work pieces.

One prior method for machining, for example, longitudinally extending flat surfaces onto round work pieces such as screws requires a machine operator to manually insert the screws, one at a time, into a centerless grinder, and hold the screw against a guide while actuating the grinding wheel toward the screw to grind the flat. The screw is then removed and another screw is inserted, held, and ground by the operator. Such an operation, however, has several disadvantages. The operation is relatively slow since it requires the operator to take several steps for grinding each screw. The in-out plunging engagement between the grinding wheel and the work pieces causes the grinding wheel to break-down or wear at a relatively high rate, further reducing productivity as the operator stops to redress the wheel to maintain desired tolerances of the machined surface. The reject rate of such an operation may also be relatively high if the desired tolerances are small and the work pieces are inserted and held at an improper angel. Moreover, this type of operation can be relatively dangerous if, for example, the work piece is relatively small and the operator's fingers must be close to the grinding wheels to hold the work piece in the correct position.

Another prior method of machining such work pieces includes the use of two or more machines that are run by one operator standing between the machines. In this instance, each machine includes a fixture adapted to releasably hold a work piece during the desired machining operation, and the operation of the machines are timed so that one machine is in a "dwell" period while the other machine is cutting a work piece. With this arrangement, the operator removes the finished work piece and installs a fresh work piece for machining into each machine during its respective dwell period by turning back and forth between the machines. Although in some instances, productivity and accuracy of the finished parts may increase with this method when compared with manually holding work pieces in a centerless grinder, such an arrangement is still relatively slow, and the requires the capital expense of two machines.

SUMMARY OF THE INVENTION

The general aim of the present invention is to provide new and improved machining methods and apparatus adapted to increase productivity and repeatability when machining identical features such as flat or curved surfaces onto work pieces, while simultaneously reducing the dangers to the machine operator, particularly when working with relatively small parts.

A detailed objective is to achieve the foregoing by providing a fixture having a plurality of work piece holders in closely spaced relation, each holder being adapted to slidably receive and carry a work piece, the fixture being further adapted to parade the holders in continuous succession past a cutting tool to carry work pieces into engagement therewith for cutting the desired surfaces.

Another detailed objective is to automatically secure the work pieces in the fixture during engagement with the cutting tool, and to automatically release the finished part thereafter for ease of removal from the fixture.

In a preferred embodiment, a machine includes a rotating circular fixture that is adapted to releasably carry work pieces, one at a time, into machining engagement with a cutting tool such as a milling cutter or grinding wheel for machining the desired surface on each work piece. In this instance, the fixture (i) includes a generally round base that is mounted for continuous rotation about a vertical axis by, for example, an electric motor, and (ii) carries work piece holding mechanisms in relatively closely spaced relation on the outer diameter portion thereof. As the fixture rotates, work pieces are inserted into each holding mechanism as they pass by a loading station near the front of the machine. The work pieces are each then carried in a circular path rearwardly into engagement with the grinding wheel, one after another in closely spaced succession, and then forwardly away from the grinding wheel for safe removal of the finished part from the fixture. Another work piece is then placed into the vacated holding mechanism as it again passes by the loading station.

With this arrangement, work pieces can be machined in continuous succession without the need for an extended dwell period, or to pause the operation of the machine as each work piece is positioned for engagement with the grinding wheel. Advantageously, this arrangement reduces the wear on the grinding wheel by replacing the in-out plunging, and back and forth motion of prior machining techniques, with a controlled, smoothly increasing and then decreasing engagement between the work piece and the grinding wheel.

The holding mechanisms are specially adapted for ease of installation of work pieces, and removal of the finished parts as the fixture continuously rotates in the machine. More specifically, each holding mechanism includes a pair of jaws that are pivotally connected for swinging toward and away from one another between a substantially closed position, and an open position defining a cavity or slot that opens in a radially outward direction, the jaws being sized to slidably receive the work piece therebetween when in the open position, and being sized to retain the work piece therebetween when in the closed position.

Springs bias the jaws toward the closed position, and the jaws separate as a work piece is inserted in a radially inward direction into position between the jaws. Once a work piece is in place in a slot, the closing force of the springs bias the jaws into engagement with the work piece and prevent the work piece from falling out of the rotating fixture.

The preferred machine also includes provision for securely clamping the work piece in the fixture during engagement with the cutting tool, and for automatically releasing the work piece after it rotates past the cutting tool. More specifically, a pressure roller (i) is connected for back and forth movement in a direction generally with and opposite the direction of movement of the holding mechanisms as they rotate past the grinding wheel, and (ii) is positioned to engage the leading jaw of each holding mechanism as it approaches the grinding wheel such that the roller travels with the holding mechanism as it passes the grinding wheel. To effect clamping of the work piece, a spring connected to the pressure roller resists movement of the roller in the direction of rotation of the fixture. As a result, the spring causes the roller to apply pressure onto the leading jaw, in the direction opposite the rotating fixture, and thus in the direction toward the trailing jaw, to clamp the work piece between the jaws during engagement between the work piece and the grinding wheel. After the work piece has passed by the grinding wheel, the roller "rolls-off" of and disengages from that holding mechanism, and the spring draws the roller down to a dwell stop, and after a brief period of time the roller automatically engages the leading jaw of the next holding mechanism approaches the grinding wheel.

Further, a mechanism is provided for automatically removing the finished parts from the fixture between the grinding wheel and the loading station. To this end, the jaws are formed with an open end such that the finished part may be removed by sliding the part through toward that end of the holding mechanism, and a linear-acting mechanism is positioned to actuate in a direction generally parallel with the axis of rotation of the fixture and toward the open end of the jaws to engage and eject the finished parts through the open end of the jaws. The actuation of this kick-out mechanism is timed to the rotation of the fixture such that the kick-out mechanism extends and then retracts each time a pair of jaws passes by. As a result, the machine operator simply inserts a work piece between each pair of jaws as they pass through the loading station, the remaining operations of the machining or grinding process being automated as described.

BRIEF DESCRIPTION OF THE DRAWINGS

FIGS. 15A–15F are sequential views showing the clamping operation of the pressure roller apparatus of FIG. 13 as a work piece approaches, engages, and then passes the grinding wheel.

FIGS. 16A–16F are sequential views showing certain steps from the installation of a work piece into a holder through completion of the grinding operation.

While the invention is susceptible of various modifications and alternative constructions, certain illustrated embodiments have been shown in the drawings and will be described below in detail. It should be understood, however, that there is no intention to limit the invention to the specific forms disclosed, but on the contrary, the intention is to cover all modifications, alternative constructions, and equivalents falling within the spirit and scope of the invention.

DETAILED DESCRIPTION OF THE INVENTION

Figure 1:
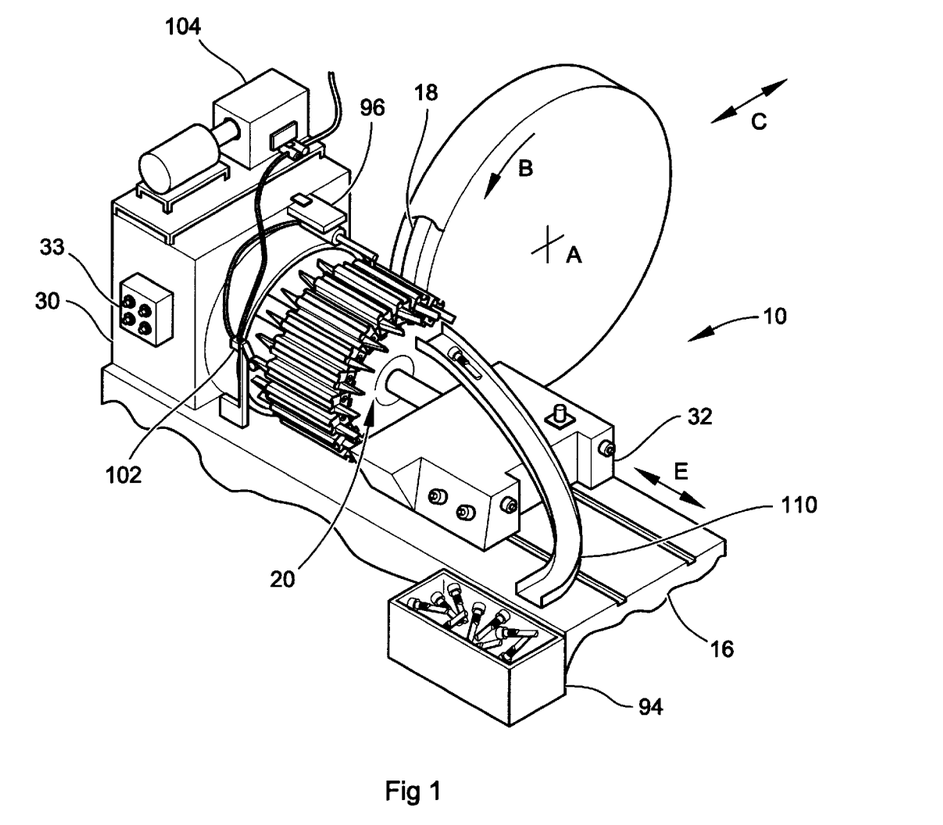
FIG. 1 is a perspective view of a grinding machine adapted to grind flats onto generally round work pieces and incorporating the unique aspects of the present invention.
Figure 2A:
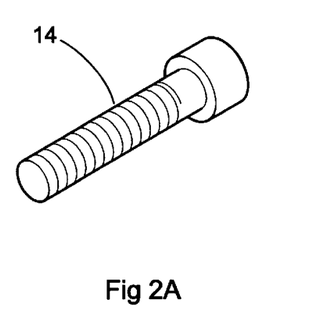
FIG. 2A and 2B are views of a work piece prior to machining, and the work piece after grinding of the flat surface, respectively.
Figure 2B:
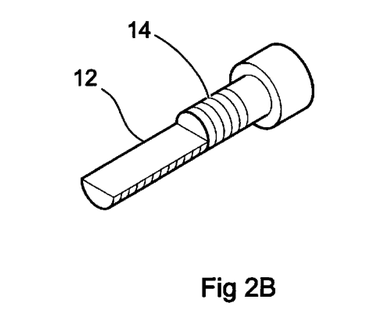

For purposes of illustration, the present invention is shown in the drawings in connection with a machine 10 (FIG. 1) adapted to grind a longitudinally extending flat surface 12 (FIG. 2B) onto a generally round work piece 14 such as a threaded screw, the work piece being shown in FIG. 2A prior to machining of the flat surface 12. For clarity of the illustration only, the heads of the work pieces are not shown in all views in the drawings.

In general, the machine 10 includes a supporting frame structure or base 16 resting on the floor, a fixture 20 adapted to hold the work pieces 14, and a grinding wheel 18 that is (i) mounted for rotation about a vertical axis extending through the center thereof as indicated at "A", (ii) power rotated, by for example an electric motor (not shown) in a direction such as indicated by arrow "B" for grinding the work piece, (iii) substantially enclosed for safety, and (iv) adapted for forward and backward translation toward and away from the base as indicated by arrow "C" and lateral translation as indicated by arrow "E" to permit selective positioning of the grinding wheel with respect to the fixture 20 for establishing grinding engagement with the work pieces in the fixture. Control switches 33 control the operation of the machine, including the grinding wheel and the other components described herein.

In accordance with the present invention, the machine 10 is uniquely adapted to carry work pieces in a continuous procession of controlled engagement with the grinding wheel 18 for machining the desired surfaces 12 onto the work pieces.

More specifically, a rotating circular fixture 20 is equipped with holders 22 on the outer diameter thereof for quickly and easily receiving work pieces 14 at a loading station near the front of the machine 10. The rotating fixture then parades the work pieces one-by-one into controlled machining engagement with the grinding wheel 18 for grinding the surfaces 12, carries the finished parts to an unloading station for removal of the parts from the fixture, and then parades the empty holders back through the loading station for continuous installation of additional work pieces. As a result, the fixture enables machining of the work pieces at a rate that is substantially greater than prior machining methods.

In carrying out this aspect of the invention, the fixture 20 is mounted for driven rotation about a vertical axis "F" parallel to axis "A" and in the direction indicated by arrow "D" (FIG. 5) such that the work pieces approach the grinding wheel in the direction opposite the direction of the grinding at the location of machining engagement. To this end, the machine 10 includes rotatable support shafts 26 and 28 (FIG. 3) that engage and support a center shaft 24 of the fixture 20. The left shaft 26 (as viewed in FIG. 3) is coupled to and rotated by an electric motor (not shown) located within the left housing 30 (FIG. 1), and is connected to the left end of the fixture shaft 24 by, for example, a coupling 27. The right shaft 28 is mounted in bearings 31 in the right housing 32 for free rotation therein, and is received into a counterbore 29 for rotatably supporting the right end of the shaft 24. The right housing 32 (FIG. 1) is slidably connected to the base 16 for axial movement of the shaft 28 as indicated by the arrow "E" to provide for clamping the fixture into the machine, and for ease of installation and removal of the fixture. Alternately, the fixture 20 could otherwise mounted for driven rotation such as bolted or otherwise connected directly to the drive head of the machine 10.

With this arrangement, the fixture 20 is adapted to carry the work pieces 14 through a generally circular path between the front and back of the machine 10. Thus, the loading station may be established such that the machine operator can have easy access to the fixture when he is positioned in front of the machine for loading work pieces, and the grinding wheel 18 can be located on the opposite side of the fixture and thus safely away from the operator.

In keeping with the invention, the work piece holders 22 are uniquely adapted to slidably receive work pieces 14 as they pass through the loading station near the front of the machine 10, to carry the work pieces rearwardly toward the grinding wheel 18, to securely hold the work pieces during machining engagement with the grinding wheel, and to release the finished parts for unloading as the holders pass through the unloading station. Thus, as the fixture 20 rotates the holders through the circular path, the holders transition between a first condition during which each holder is adapted to receive and release a work piece, and a second condition during which the work piece is securely clamped in the holder, the holder being in said first condition at the loading and unloading stations.

Figure 7:
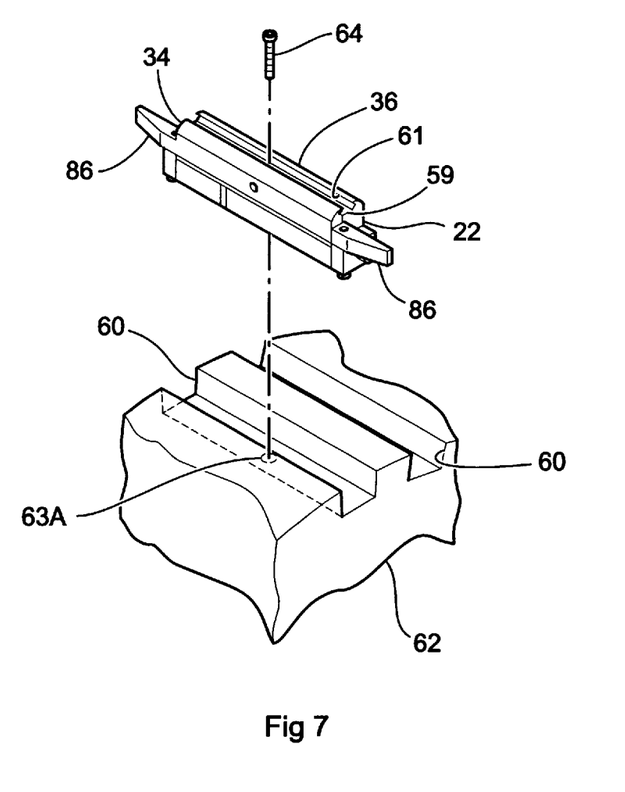
FIG. 7 is an exploded perspective view of a holder and a fragmentary perspective view of the fixture base.
Figure 8:
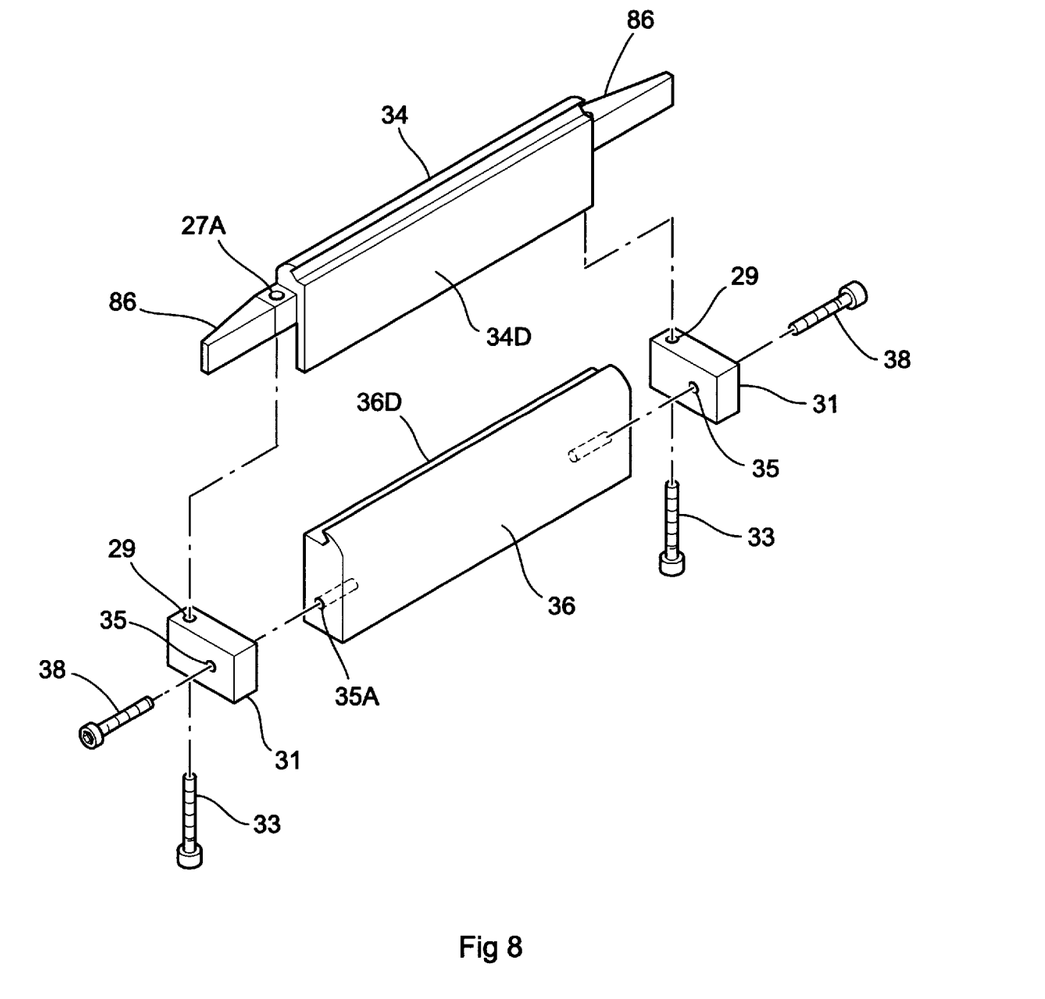
FIG. 8 is an exploded view of the parts of the holder.
Figure 9:
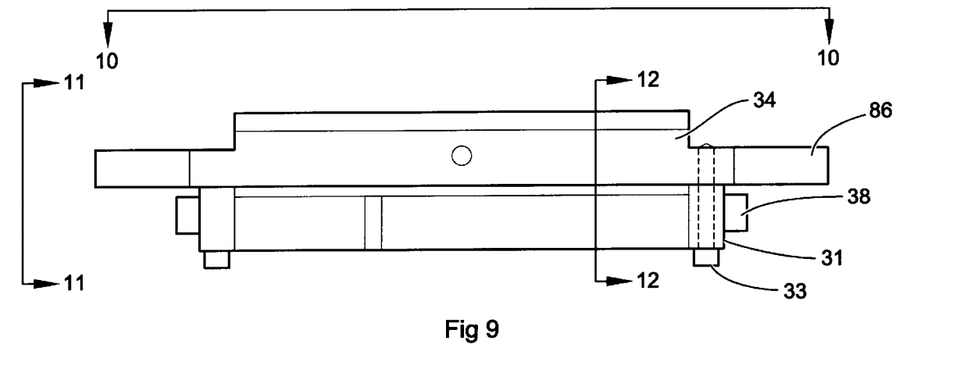
FIG. 9 is a front view of the assembled holder.
Figure 10:
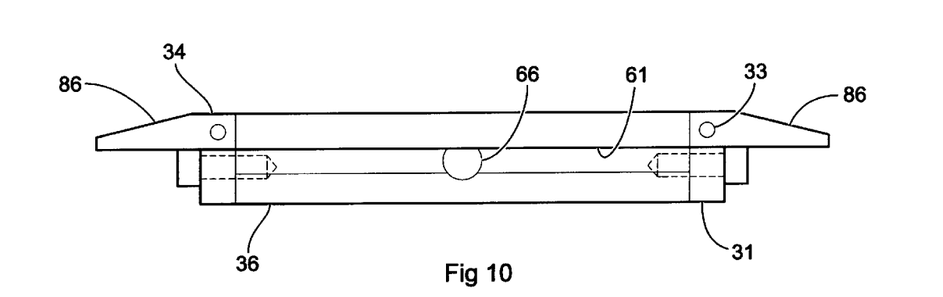
FIGS. 10 and 11 are top and side views, respectively, of the clamping fixture taken along the lines 10—10 and 11—11, respectively, of FIG. 9.

In carrying out this aspect of the invention, each holder 22 includes a pair of jaws 34, 36 that are connected with shoulder screws 38 or like pivot means for pivoting movement toward and away from one another between a "closed" position and an "open" position; the jaws being spaced to slidably receive a portion of the work piece therebetween when in the open position, and adapted to grab and retain the work piece therebetween when in the closed position. To this end, the shoulder screws extend parallel with the axis "F" of the fixture 20 such that a slot 61 or other cavity sized to receive a portion of the work piece opens in a radially outward direction as the jaws pivot from the closed position to the open position. The jaws are secured to the outer diameter of the fixture base 62, such as into slots 60 (FIG. 7), with screws 64. In this instance, the trailing jaw 36 (when considered in the direction of rotation of the fixture) is fixed with respect to the rotating fixture, such as with the screw 64 extending through an opening 63 formed therein and threaded opening 63A formed in the base 62, and the leading jaw 34 is connected for pivoting toward and away from the trailing jaw. Advantageously, such an arrangement permits quick replacement of a holder if, for example, one of the jaws should become damaged. Alternately, the leading jaw may be mounted to the base independently of the trailing jaw such that the leading jaw pivots toward and away from the trailing jaw as generally described herein.

The holder 22 shown includes side plates 31 to which the leading jaw 34 is fixed with screws 33 slipping through openings 27 in the side plates and threaded into openings 27A in the jaw. The side plates and leading jaw then pivot as one piece about the shoulder screws 38 extending through openings 35 in the plates and threaded into openings 35A in the trailing jaw 36.

Figure 16:
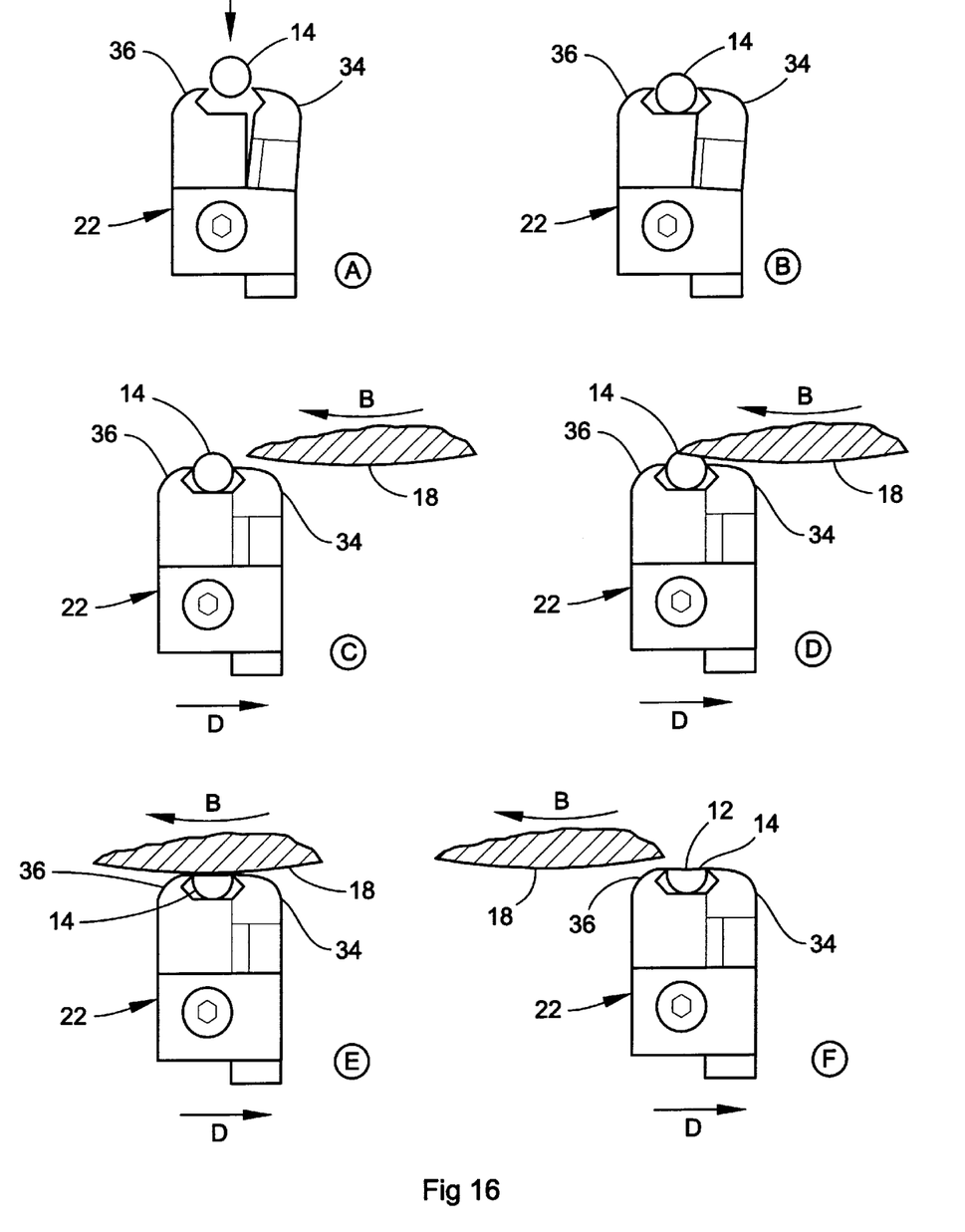

In general, the jaws 34, 36 are formed with a cross section profile to generally compliment the shape or cross section profile of the portion of the work piece to be received in the slot 61 for grabbing and/or holding the work piece as the fixture 20 rotates. To this end, the jaws 34 and 36 are formed with fingers 37 and 39, respectively, that extend toward one another to define the slot 61 with a narrowed opening for receiving a portion of a work piece and retaining the work piece in the fixture against the pull of gravity as the holder rotates through the lower portion of the circular path. Thus, in the embodiment shown, that the fingers are sized to "grab" the generally round work piece 14 above its center (as viewed, for example, in FIG. 16) when positioned in the slot.

In further carrying out the invention, compression springs 44 (see FIGS. 5 and 6) are connected between the fixed trailing jaw 36 of each holder 22 and the leading jaw 34 of the following holder 22 for biasing the leading jaws 34 toward the trailing jaws 36 of the respective holders, thus biasing the leading jaws toward the "closed" position, the minimum distance between the jaws being established by the facing surfaces 34D and 36D (FIG. 6) of the jaws 34 and 36, respectively.

With this arrangement, the jaws 34, 36 separate as the work piece 14 is inserted into position in the slot 61, and the springs 44 close the jaws on the work piece to retain it in the holder 22 as the fixture rotates. More specifically, the work piece is inserted into the holder positioning the work piece extending longitudinally between and outwardly of the fingers 37 and 39, and then pressing the work piece radially inwardly toward the center of the fixture. This results in a tangential force component acting on the leading jaw 34 and against the force of the associated spring 44 such that spring force is overcome and the leading jaw separates from the trailing jaw to receive the work piece therebetween, this sequence being generally shown in FIGS. 16A and 16B. After the work piece is inserted into the slot 61, the biasing force of the spring 44 automatically closes the leading jaw 34 to clamp the work piece in place. This arrangement results in a unique snapping action when the work piece is inserted into the holder.

In the present instance, the curved outside diameter of the work piece 14 acts as a lead-in chamfer to provide the tangential force component needed to separate the jaws and allow the work piece to snap in place in the holder. Alternately, for example, the jaws may be formed with a lead-in chamfer to enable installation as described for a work piece with a substantially flat "bottom".

In addition, the cross-sectional profile of jaws 34, 36 or fingers 37, 39 are preferably configured to impart a clamping force having a radially inwardly directed component acting onto the work piece 14 to insure that work piece seats against the base 61A of the slot 61. Provided the location of the base of the slots are precisely controlled, this arrangement provides for accurate control of the thickness of the finished part to the flat surface 12.

In an alternate embodiment (FIG. 12), the jaws 34A, 36A of the holder 114 are spring biased toward the open position, such as provided for with compression spring 112 located in a bore extending between the jaws and acting between the closed end 111 of the bore in the leading jaw 34A and a set screw 110 threaded into the trailing jaw 36A. In this instance, the jaws must be sufficiently separated when in the spring-biased open position to slidably receive the work piece through an open end of and longitudinally between the jaws. The jaws are then formed with fingers or otherwise configured and dimensioned to engage the work piece when the holder is positioned at the bottom of the circular path and the slot opens downwardly such that the work piece is retained in the holder with the jaws in the open position as the fixture rotates. In other words, the jaws are configured to longitudinally slidably receive the work piece through the open end 59 while the fingers are spaced to restrict the radially outwardly facing longitudinal opening of the slot 61.

Such an arrangement, however, requires that the work piece and the slot be longitudinally aligned before the work piece can be inserted into the holder, and may be suitable for certain parts such as larger diameter, shorter work pieces. However, installation of relatively long, smaller diameter work pieces will not typically be accomplished as quickly in this manner as snapping the work pieces radially into the holders. Moreover, such an arrangement requires relatively tightly controlled positioning of the jaws in the spring-biased open position, and possibly means for adjusting the open position if the jaws, requirements that simply do not exist in the spring-biased closed arrangement.

Figure 11:
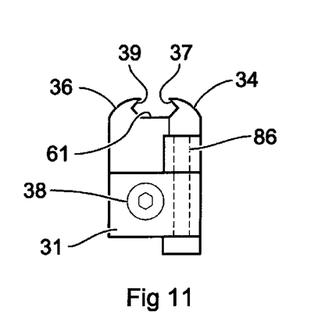

In further keeping with the invention, the machine 10 includes provision for controlled clamping of each work piece 14 as it approaches the grinding wheel, during the grinding operation on each work piece, and for a brief period of time after the work piece is past the grinding wheel 18 to prevent spinning of the work piece during engagement with the grinding wheel 18. More specifically, a pair of clamping mechanisms 70 (FIGS. 5 and 11) are positioned on each side of the fixture 20, and are adapted to apply pressure on the leading jaw 34 of each holder 22, in the direction toward the trailing jaw 36, as the holder approaches and until it passes the grinding wheel 18.

Each clamping mechanism 70 includes a roller 80 connected to an arm 74 that is pivotally connected to a base portion 72 by way of a pin 76, such that the roller is connected for swinging through an arc as generally indicated by arrows "G". The base portion 72 is connected to the base 16 of the machine 10 for lateral and axial adjustment to accommodate holders and fixtures of different sizes and configurations. Springs 78 connected between the arms 74 and the base portion 72 bias the arms in a downwardly direction.

The rollers 80 are positioned to engage downwardly sloping wing portions 86 on each side of the leading jaw 34 of each holder as it approaches the grinding wheel 18. The rollers then roll down the wings as the holder advances and the work piece progresses through the grinding operation. Finally, the rollers roll off of the wings to release the work piece after the grinding operation has been completed. In this way the downward spring force from the springs 78 acting on the arms 74 and the upward motion of the holders co-act to clamp the work piece into the holder during the grinding operation The clamping mechanism 70 also includes an adjustable "stop" for the downward swinging movement of the arm 74. In the embodiment shown, the stop is in the form of a screw 82 (FIG. 13) threaded into and extending upwardly from the base portion 72 of the clamping mechanism. The screw 82 is adjusted for engagement with the arm at a predetermined location, and is locked into position with a jam nut 84 (as seen in the left clamping mechanism in FIG. 13 with the base cut-away and shown in cross-section). The stop 82 is positioned to stop the downward swinging of the arm 74 prior to engagement between the roller 80 and the wing 86. Absent these stops, the downwardly swinging rollers 80 will bang into the upwardly rotating holders 22, potentially resulting in damage to the rollers and/or the wings 86, reduced tolerance control on the parts as the fixture is jarred, and reduced life of the grinding wheel; the stops 82 eliminate these undesirable effects.

Advantageously, the provision of clamping rollers 80 on both sides of the fixture, as opposed to the provision of only one clamping roller, provides for even distribution of the clamping forces on the work piece in the holder, a division of the clamping force that each roller must impart to the holder to securely clamp the work piece, reduction in the impact forces between the rollers and the wings of the holder, and associated improvement in tolerance control on the machined surface.

The operation of the clamping mechanism 70 is best understood with reference to FIGS. 15A-F wherein the sequential position of two advancing holders 22, identified in FIGS. 15A–F for the purposes of the following sequential description of operation as holders 22A and 22B, and one of the two clamping mechanisms 70 are illustrated, the operational timing and sequencing of the second clamping mechanism 70 on the other side of the holders being identical to the mechanism 70 shown and described below.

Figure 15:
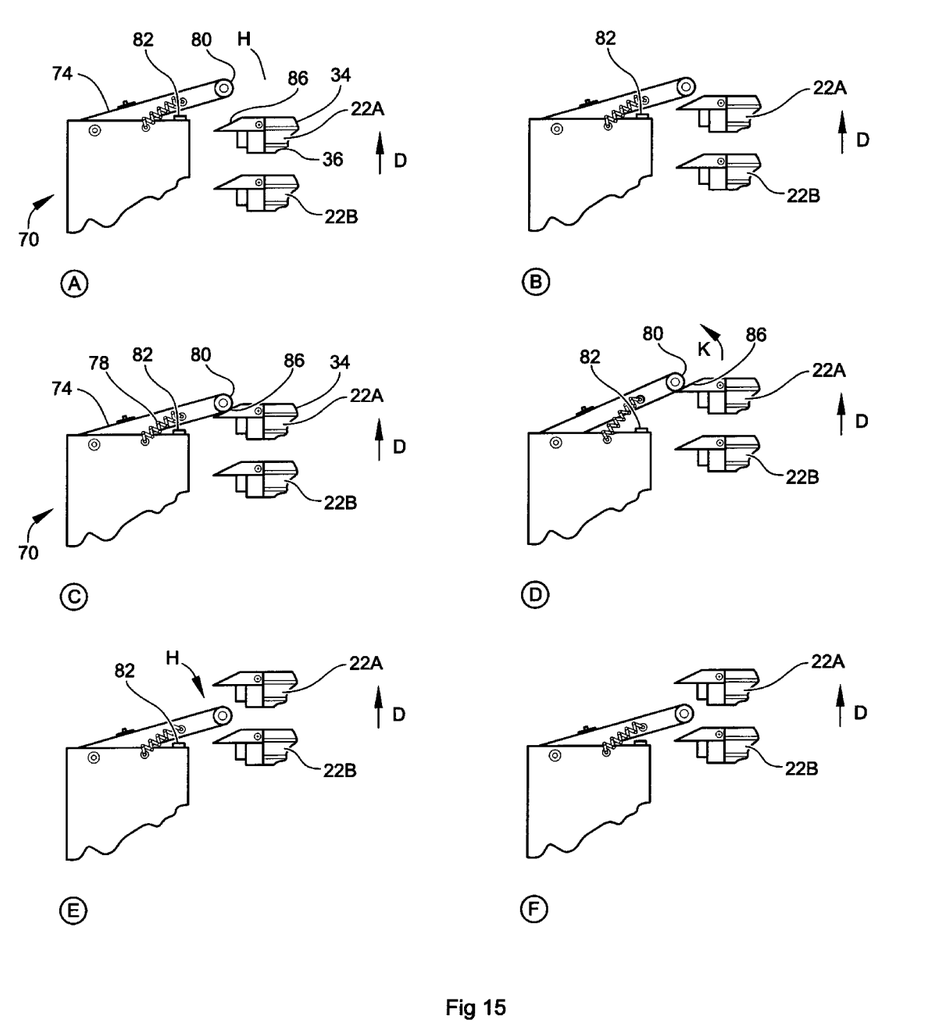

FIG. 15A depicts the arm 74 and roller 80 swinging downwardly as indicated by arrow "H", and the holders 22A, 22B simultaneously rotating "upwardly" as the fixture 20 is rotated in the "D" direction.

In FIG. 15B, the holders 22A, 22B have advanced upwardly from the position shown in FIG. 15A, and the downward swinging of the arm 74 has stopped as a result of engagement with the end of the screw 82 just prior to engagement between the roller 80 and the first holder 22A.

In FIG. 15C, the holders 22A, 22B have continued to advance from the position shown in FIG. 15B such that the wings 86 of the leading jaw 34 of the first holder 22A engages the roller 80. At this point, (i) the upwardly moving holder 22A begins to lift the arm 74 from the stop 82, (ii) the holder 22A is positioned such that the work piece 14 is just below and prior to engagement with the grinding wheel 18 as generally illustrated in FIG. 16C (discussed further below), and (iii) the downwardly directed force of the clamping spring 78 acting on the arm 74 through the roller 80 causes the leading jaw to clamp the work piece 14 (not shown in FIG. 15C, but shown in FIG. 16C) in the holder 22A. And as previously mentioned, the clamped jaws impart a clamping force onto the part radially inwardly to seat the work piece against the base 61A of the slot 61.

Figure 13:
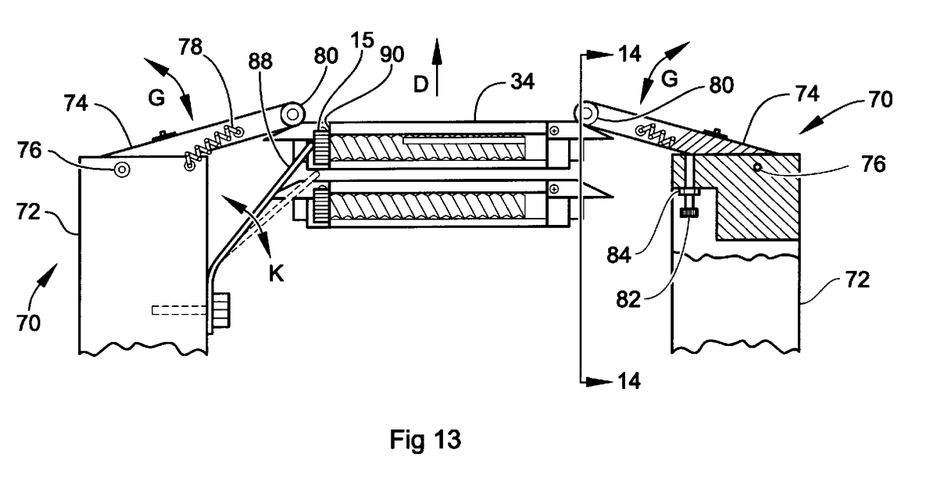
FIG. 13 is a view taken substantially along the line 13—13 of FIG. 5, and showing pressure roller apparatus clamping a work piece into the holder.
Figure 14:
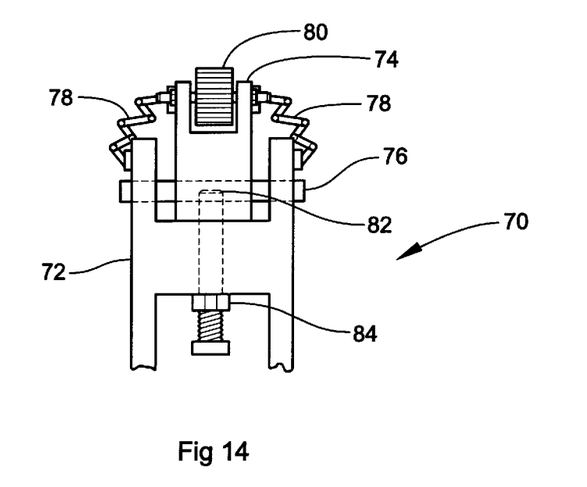
FIG. 14 is a view taken along the line 14—14 of FIG. 13.

Between the sequences illustrated in FIGS. 15C and 15D, and as generally shown in FIGS. 13 and 16D, the work piece 14 in holder 22A has begun to engage the grinding wheel 18.

FIG. 15D shows the holder 22A having advanced to or just past the end of the grinding operation, such that the flat surface 12 has been ground onto the work piece 14 as depicted in FIG. 16F. At this point, the arm 74 has been drawn upwardly (as compared with the position shown in FIG. 15C and as indicated by arrow "K") by the advancing holder 22A to approaching its maximum normal upward stroke, and the roller 80 has simultaneously rolled "down" the slope of the wing 86 and outwardly toward the free end thereof.

The grinding of the flat surface 12 on the work piece 14 in holder 22A having been completed, the roller 80 then rolls off the free end of the wing 86, as the holder 22A continues to advance, and releases the leading jaw 34 from its clamping position. By virtue of the bias resulting from the spring 78, the arm 74 then swings downwardly as indicated by arrow "H" toward the next approaching holder 22B as shown in FIG. 15E. It is noted that this is the same approximate location of the arm 74 and roller 80 as depicted in FIG. 15A after rolling off of the holder preceding the holder 22A and prior to engaging holder 22A.

Advantageously, the downwardly sloping wings 86 aid in providing for a smooth grinding operation by reducing the stroke of travel of the roller 80 for the linear travel of the holder through the grinding operation, as compared with simply allowing the rollers to roll on the generally radially extending leading surface of the leading jaw, or an extension thereof. As is known, reducing the travel for any spring aids in increasing the spring endurance life, and reducing the travel reduces the increase in the spring/clamping force (due to the spring rate) during the stroke of the rollers. Since a minimum clamping force is established initially on the part to prevent rotation during the machining, the less increase in spring force the better to minimize the impact forces between the arm and the stop 82.

The positions of the arm 74 and roller 80 shown in FIGS. 15A and 15B are repeated in FIGS. 15E and 15F, respectively, as the next holder 22B advances to carry the next work piece into engagement with the grinding wheel, the above described sequence repeating for each holder and work piece in the rotating fixture 20.

With the foregoing in mind, it will be apparent that FIGS. 16A through 16F are sequential views showing the installation of a work piece 14 into a holder 22 (FIG. 16A and 16B), and the work piece being releasably carried in the holder and approaching and then passing the grinding wheel 18 for grinding of the flat surface 12 (FIGS. 13C–13F), after which the holder and finished part will proceed to the unloading station.

Figure 12:
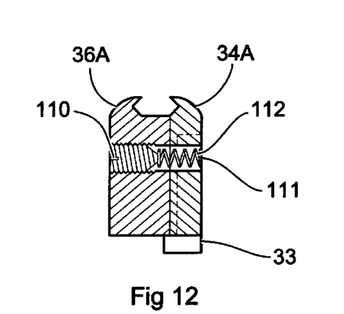
FIG. 12 is a cross-sectional view taken along the line 12—12 of FIG. 9 and showing details of an alternate holder.

In carrying out yet another aspect of the invention, the machine 10 includes provision for insuring that the work piece 14 is properly positioned longitudinally in the holder 22 prior to the grinding operation. In the embodiment shown, a resilient metal strip, or spring lever 88 (FIGS. 5 and 13) connected to the base portion 72 of the clamping mechanism 70 is adapted to apply a biasing force onto the work piece, with a component acting longitudinally onto the work piece (to the right as viewed in FIG. 13) to insure that the head 15 of the work piece is pushed into the holder to the right such that the head engages an edge 90 of the holder. To this end, the spring lever 88 (i) is generally aligned with the work pieces in the fixture as they approach the grinding wheel (see FIG. 5), (ii) is configured such that its free, normally spring-biased position is generally as indicated in dashed lines in FIG. 13, (iii) is positioned to slidably engage the head of a work piece and to impart onto the work piece said longitudinal biasing force such as at the point illustrated in FIG. 15A and 15B, just prior to the time that the rollers 80 clamp that work piece into the holder as illustrated in FIG. 12C and for a short duration thereafter, after which the lever 88 slips from that work piece as it advances and then engages the work piece advancing in the next holder to slide that work piece to the right until its head engages the edge 90 of that holder prior to engagement of the roller with that holder, and (iv) includes sufficient lateral spring force component to overcome any friction between the work piece and the jaws 34, 36 of the holder, such as the friction resulting from the spring-biased closed holder when the work piece is loosely held in the fixture prior to clamping engagement of the roller 80 on that holder. As a result, with the edges 90 of the holders aligned, the flat surface 12 is ground at the same axial position on each part with respect to the base of the head. Alternately, one skilled in the art will recognize that other datum could be established between the work piece and the holder for establishing desired dimensional characteristics of the finished parts.

In yet another aspect of the invention, the machine 10 is automated for (i) unloading of finished work pieces 14 from the fixture 20 as the holders 22 pass through the unloading station, and (ii) discharging the finished parts into a holding bin 94 (FIG. 1). As a result, the machine operator need only load work pieces into empty holders as they continuously rotate through the loading station in the front of the machine, all other functions of the grinding operation being entirely automated.

In carrying out this aspect of the invention, the machine 10 includes a kick-out mechanism 96 (see FIGS. 3 and 5) that is adapted to push the finished work pieces 14 through the open end 59 (FIG. 7) of the slot 61 (see FIG. 5 and 7) in each holder 22 as the holders advance beyond the clamping mechanism 70. To this end, the kick-out mechanism includes a lever 98 connected to a pneumatic cylinder 100 that is aligned for actuation parallel with the slots 61, and that is spring-biased for a clearing relation between the lever 98 and the fixture (see FIG. 4). The cylinder is actuated with air pressure selectively supplied from a pump 104 (FIG. 1) in response to actuation of a switch 102 (FIG. 3) that is operatively connected between the cylinder and the pump via air hoses 106 and that is adapted to trigger of operate for each holder as is rotates through the unloading station.

Figure 3:
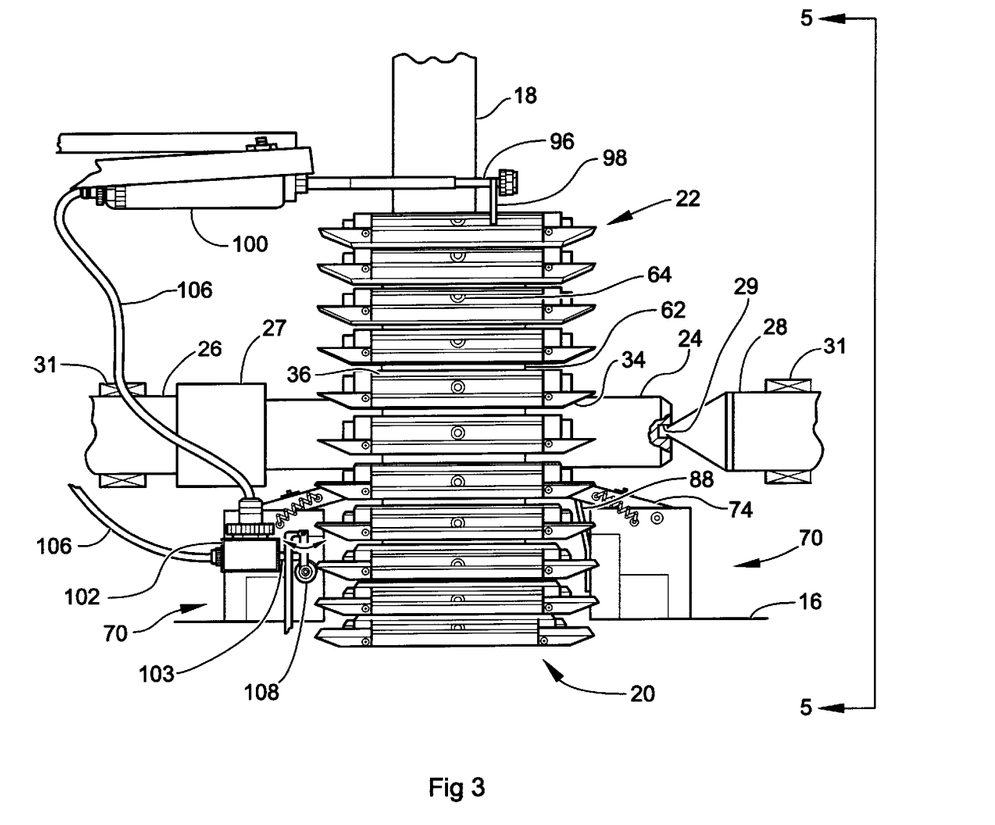
FIG. 3 is an enlarged front view of a fixture according to the invention for holding work pieces, and certain associated parts, shown in FIG. 1.
Figure 4:
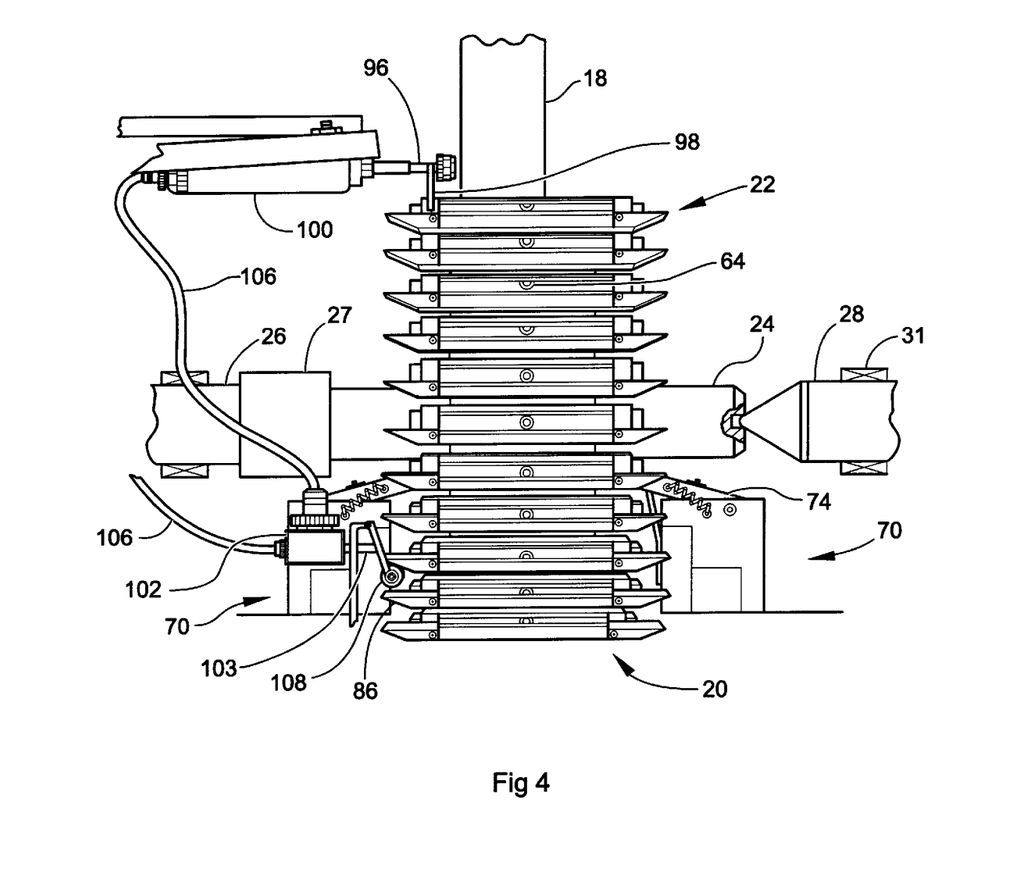
FIG. 4 is a view similar to FIG. 3 but showing an alternate position of a work piece kick-out mechanism.
Figure 5:
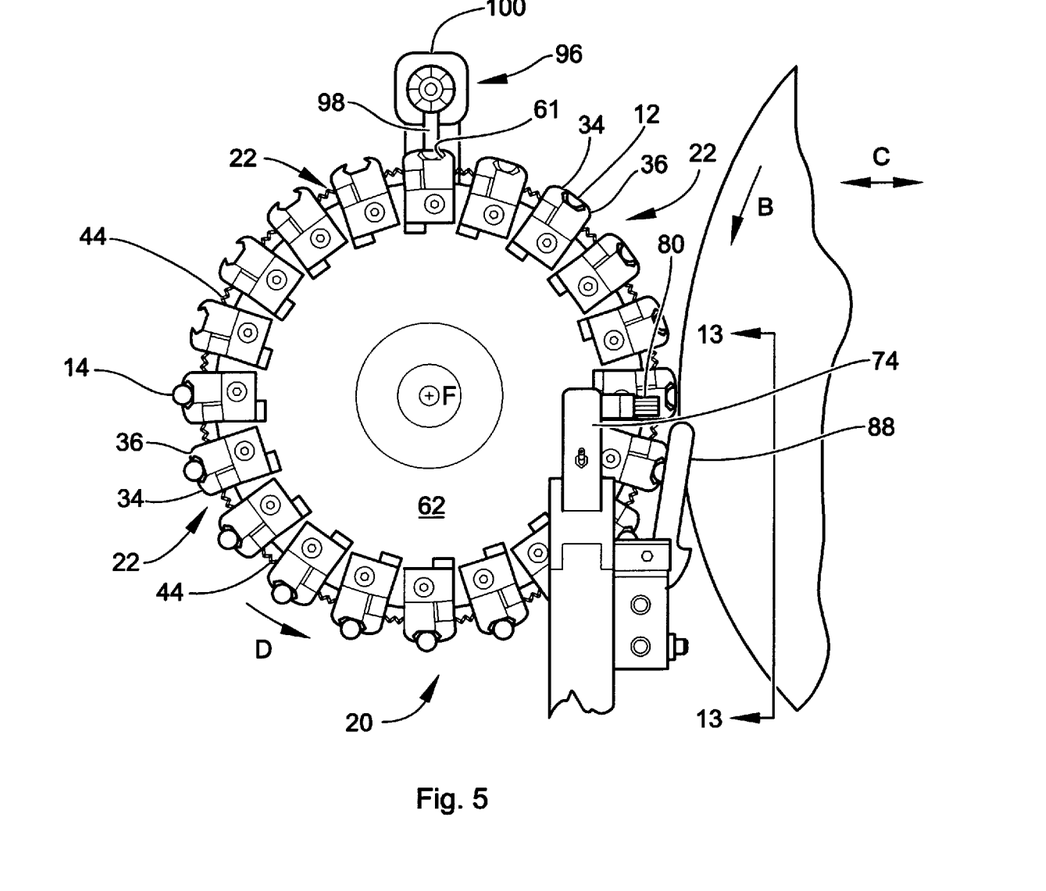
FIG. 5 is a side view taken generally along the line 5—5 of FIG. 3.
Figure 6:
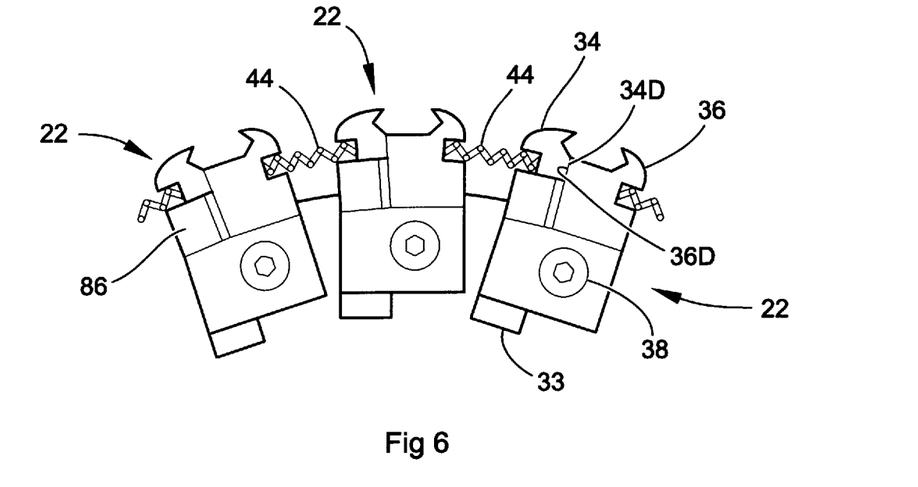
FIG. 6 is an enlarged side view of holders shown in FIG. 5.

In the embodiment shown, a timing roller 108 is positioned to engage each advancing holder 22 on the rotating fixture 20, and is connected to the plunger 103 of the switch 102. In the present instance, the timing roller 108 is spring biased to swing inwardly toward the fixture and between the wings 86 of adjacent holders, and to engage the inner portion of the wing on the approaching holder as generally illustrated in FIG. 4. As the fixture rotates, the roller 108 rolls along the wing 86 toward the free end as generally illustrated in FIG. 3, and then off the end of the wing, and then swings inwardly in front of the next approaching holder as a result of the spring bias. At an established point in the swinging stroke of the roller, such as when the roller approaches the free end of the wing 86, the switch 102 actuates, briefly establishing communication between the pump 104 and the pneumatic cylinder 100. At this same instant, the lever 98 is generally aligned with the slot of a holder in the unloading station as shown in FIG. 5. When the cylinder actuates, the lever engages the end of the finished work piece 14 in that holder and pushes it through the open end 59 of the holder, whereupon the work piece slides down a chute 110 and into a bin 94 connected to the frame 16 of the machine or resting on the floor. An internal spring in the pneumatic cylinder then automatically retracts the cylinder and lever 98 to the clearance position shown in FIG. 5. As a result, the actuation of the cylinder is timed and synchronized with the continuous rotation of the fixture, and is independent of the actual speed of rotation.

From the foregoing, it will be apparent to one skilled in the art that the machining methods and apparatus disclosed herein may be modified within the scope of the present invention to produce finished parts having other shapes. For example, if parallel flats are desired on opposing sides of the work piece, the parts can be run as described to produce one flat, and then the position of the grinding wheel may be adjusted to account for the difference in the material thickness of the work piece after the first flats have been machined for grinding the second flat. Alternately, for example, if two flats are to be formed at rights angles, the cross-section of the jaws may be modified for orienting the part after the first flat has been machined. The cross-section profile of the jaws 34, 36 may be adapted to receive and releasably carry alternately shaped work pieces, such as by providing a lead-in chamfer on the longitudinal outer edge portions of the fingers 37, 39. The cross-section of the base 61A of the slot 61 may be modified for the purposes of orienting non-round parts in the fixture. The axis "F" may be oriented non-parallel to axis "A" to machine a flat that is not parallel to the longitudinal axis of the work piece, or the base 61 of the slot in the holder may be modified to hold the work piece at a non-parallel angle with respect to axes "A" and "F".

From the foregoing, it will also be apparent that the methods and apparatus of the present invention are uniquely adapted to substantially enhance productivity and reliability in certain machining operations. By virtue of the continuous procession of work pieces carried into machining engagement with the grinding wheel and the controlled clamping of the work pieces just prior to and during such engagement, work pieces can be machined at a substantially faster rate, with improved accuracy control, and with less danger to the machine operator than is available using prior machining methods and apparatus. And providing means for automatically discharging the finished parts from the fixture leaves the machine operator free to simply load the work pieces in the fixture as is continuously rotates.

We claim:

1. A machine having a work piece loading station, a work piece machining station, and a work piece unloading station, said machine comprising:

a first jaw;

a second jaw connected for movement between a first position and a clamping position with respect to said first jaw;

first spring means for biasing said second jaw toward said first position;

said jaws being adapted to slidably receive a work piece therebetween when said second jaw is in said first position;

means for cyclically carrying said jaws from the loading station to the machining station and then to the unloading station and then back to the loading station;

a cutting tool positioned for machining engagement with a work piece carried in said jaws when in said machining station;

means for clamping said work piece between said jaws in said clamping position to prevent movement of said work piece with respect to said jaws when in said machining station;

said clamping means including (i) rolling means positioned to engage said second jaw as it is carried into said machining station, and (ii) second spring means connected to said rolling means for biasing said second jaw toward said first jaw and clamping the work piece between said jaws; and means for automatically disengaging said rolling means from said second jaw when said jaws are carried from said machining station.

2. A machine as defined in claim 1 in which said second jaw recedes from said first jaw upon moving from said clamping position toward said first position to define a slot therebetween, said slot having an end opening sized to slidably receive a work piece, said slot further having a longitudinally extending opening through which the work piece extends for machining engagement with said tool, one of said jaws including finger means restricting the size of said slot at said longitudinally extending opening for retaining said work piece in said slot.

3. A machine as defined in claim 1 in which said second jaw approaches said first jaw upon moving from said clamping position toward said first position, said jaws automatically separating against the resilient biasing force of said first spring means as a work piece is inserted between said jaws, said first spring means retaining said work piece between said jaws.

4. A machine as defined in claim 1 in which said rolling means is connected for back and forth movement between a dwell position and a second position, said second spring means biasing said rolling means toward said dwell position, the movement of said rolling means being timed such that said roller means reaches and rests in said dwell position prior to said jaws reaching said machining station.

5. A machine as defined in claim 1 further comprising means for automatically removing the work piece from between said jaws when in said unloading position.

6. A machine for machining a work piece comprising:

a fixture;

means for rotating said fixture about an axis;

a plurality of work piece holders connected to said fixture for rotation therewith;

each holder including: (i) a cavity for receiving a work piece, said cavity having an outwardly facing access opening, (ii) a jaw connected for movement between an open position and a closed position, said jaw restricting the size of said opening for restricting access to said cavity when said jaw is in said closed position, and (iii) first spring means for biasing said jaw to said closed position;

said jaw of each holder being adapted to automatically transition from said closed position toward said open position to allow a work piece to be snapped into the associated cavity when the work piece is aligned with the associated restricted opening and then pressed inwardly toward the cavity;

a cutting tool positioned proximate said fixture such that work pieces carried in said holders approach said tool, then engage said tool for machining thereof, and then rotate past said tool as said fixture rotates; and means for automatically clamping the work pieces in said holders to prevent movement of the work pieces during machining thereof, said clamping means (i) engaging each of said jaws as each jaw approaches said tool, and then (ii) disengaging from said jaws as each rotates past said tool.

7. A machine for machining a work piece comprising:

a fixture;

means for rotating said fixture about an axis;

a plurality of work piece holders connected to said fixture for rotation therewith;

each holder including: (i) a cavity for receiving a work piece, said cavity having an outwardly facing access opening through which a work piece may be inserted into said cavity, (ii) a jaw connected for movement between a first position and a clamping position, said jaw further having an edge portion for restricting the size of said opening, and (iii) first spring means biasing said jaw toward said first position;

a cutting tool positioned proximate said fixture such that, as said fixture rotates, work pieces carried in said holders approach said tool, then engage said tool for machining thereof, and then rotate past said tool; and means for automatically positioning the work pieces in said holders prior to machining thereof, said positioning means including means for resiliently biasing said work pieces in a direction generally parallel to said axis and against said edge portion.

8. A machine as defined in claim 7 in which said positioning means engages each work piece prior to machining engagement between that work piece and said tool, and then disengages from that work piece during said machining engagement for positioning engagement with the next work piece on the fixture.

9. A machine for machining a work piece comprising:

a fixture;

means for rotating said fixture about an axis;

a plurality of work piece holders connected to said fixture for rotation therewith;

each holder including: (i) a cavity for receiving a work piece, said cavity having an outwardly facing access opening, (ii) a jaw connected for movement between a first position and a clamping position, and (iii) first spring means biasing said jaw toward said first position;

a cutting tool positioned proximate said fixture such that, as said fixture rotates, work pieces carried in said holders approach said tool, then engage said tool for machining thereof, and then rotate past said tool; and means for clamping said work pieces against movement in said holders during machining thereof, said clamping means including: (i) rolling means pivotally connected for swinging movement between first and second positions, and (ii) second spring means biasing said rolling means to said first position;

said rolling means being positioned (i) to engage the jaws of each holder in rolling relation to effect said clamping as each holder approaches the tool, (ii) to then transition from said first position to said second position as the associated work piece rotates through machining engagement with and then past said tool, (iii) to then roll off of each holder and automatically return to said first position for engagement with a next holder on the fixture, and (iv) to then dwell briefly in said first position prior to engagement with said next holder.

10. A machine as defined in claim 9 in which (i) said holders approach said tool in a first direction, (ii) said jaws include ramp means having a free end and that slope at an angle generally away from said first direction upon proceeding toward said free ends, and (iii) said rolling means engage said ramp means to effect said clamping and roll along said ramp means towards said free ends as said holders rotate past said tool.

11. A machine as defined in claim 9 in which said rolling means include two rollers independently connected for said swinging movement and located on each side of said fixture, said rollers being positioned to engage said ramp means on each side of the work pieces.

12. A machine for machining a work piece, said machine comprising:

a generally circular fixture;

means for rotating said fixture;

a plurality of work piece holders connected to said fixture for rotation therewith, each holder including (i) first jaw and second jaws, said first jaw being pivotally connected for movement between first and second positions with respect to said second jaw, the jaws of each holder being adapted to slidably receive a work piece therebetween when in said first position, and (ii) a first spring connected to said first jaw and adapted to bias said first jaw to said first position;

means for releasably retaining work pieces in said holders as said fixture rotates;

a cutting tool positioned proximate said fixture such that, as said fixture rotates, the work pieces in said holders, in turn, (i) approach said tool in a first direction, said first jaw leading said second jaw as said holder approaches said tool, (ii) then engage said tool for machining thereof, and (iii) then rotate past said tool; and clamping means for temporarily clamping the work pieces, in turn, into the holders as each holder approaches said tool, said clamping means including (i) roller means pivotally connected for swinging through an arc extending generally in said first direction and in generation generally opposite said first direction, said roller means being positioned for engagement with the first jaw of one of said holders, and with the first jaws of each successive roller, in turn, as said rollers approach said tool, and (ii) a second spring connected to said roller means and biasing said roller means in said generally opposite direction such that said spring acting through said roller means applies pressure onto said first jaw for clamping the work piece between the jaws of said holder.

13. A method of machining surfaces onto work pieces, said method comprising the steps of:

(A) providing:
  (1) a generally circular fixture mounted for rotation about a first axis;
  (2) a plurality of work piece holders connected to said fixture for rotation therewith, wherein each holder includes a first jaw and a second jaw connected for movement between a first position and a clamping position, with each holder being adapted to slidably receive and releasably carry a work piece such that the work pieces travel in a circular path around said first axis as said fixture rotates;
  (3) a cutting tool for forming said surfaces; and
  (4) means for selectively clamping the work pieces to prevent rotation of said work pieces in said holders;

(B) inserting work pieces into said holders;

(C) positioning said tool proximate said fixture for machining engagement between the tool and the work pieces through a first arc length of said path;

(D) rotating said fixture such that each holder, in turn, approaches and then passes said tool for machining engagement of the work piece therein with said tool;

(E) clamping each work piece into its respective holder via a clamping means engaging each of said holder's first jaw for effecting said clamping step during machining of said workpiece as the holder approaches said tool; and (F) unclamping each finished work piece from its respective holder after passing through said first arc length of engagement with said tool.

14. A method as defined in claim 13 in which said first axis extends generally horizontally, said holders being adapted to carry the work pieces through a circular path that travels in a generally vertically extending plane.

15. A method as defined in claim 13 further comprising the step of rotating said tool about a second axis that is generally parallel to said first axis.

16. A method as defined in claim 13 in which said second jaw is resiliently biased toward said first position.

17. A method as defined in claim 13 in which said holders are formed with openings facing in a direction generally parallel to said first axis, said work pieces being adapted to be slidably removed from said holders through said openings, said method further comprising the steps of:

(G) providing means for selectively engaging the work pieces; and (H) actuating said engaging means in a direction generally parallel to said first axis and in a direction generally toward said opening for ejecting each work piece from its respective holder through said opening.

* * * * *